Patented Jan. 20, 1953

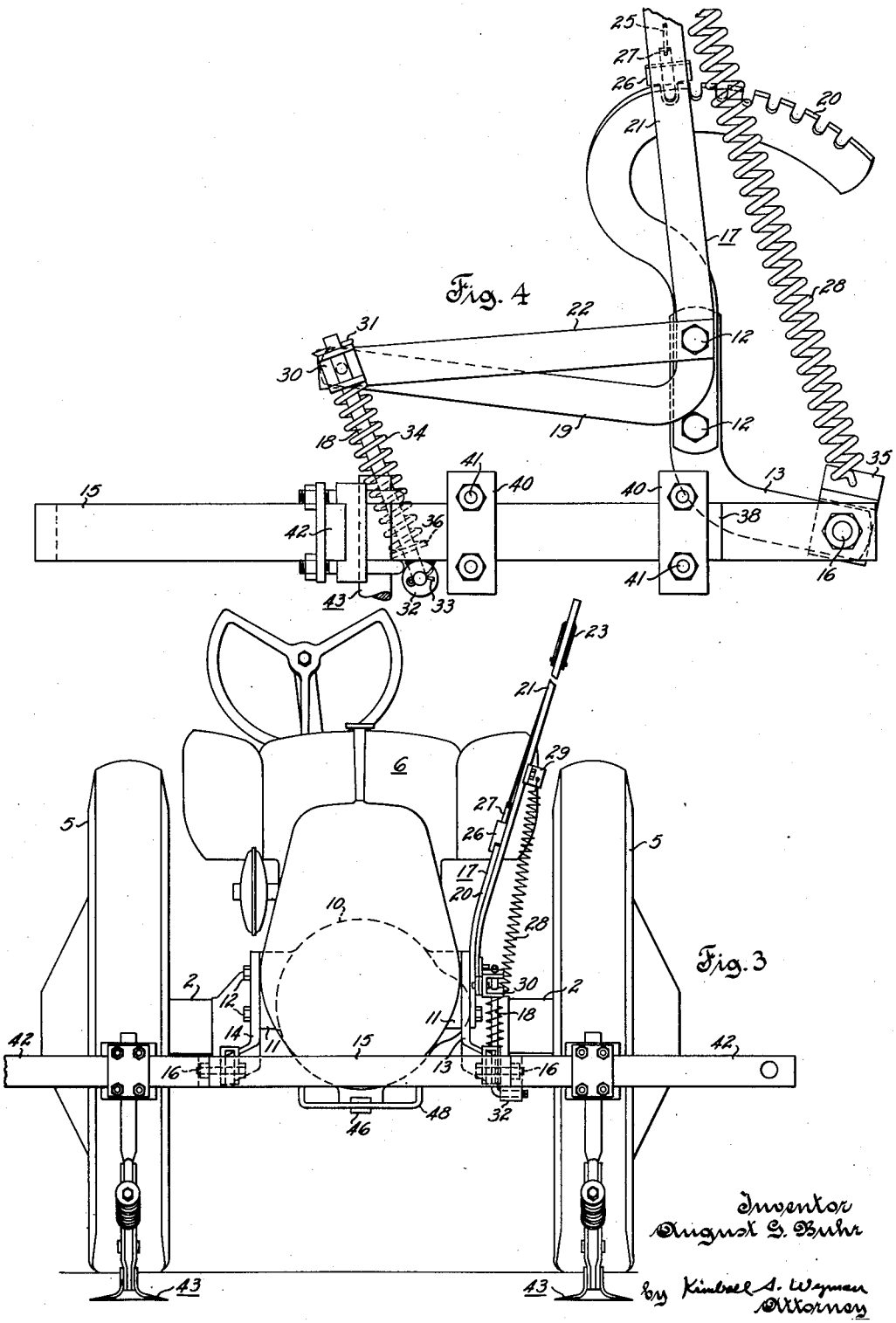

2,625,869

UNITED STATES PATENT OFFICE 2,625,869

REAR MOUNTED IMPLEMENT FOR TRACTORS

August G. Buhr, La Crosse, Wis., assignor to Allis-Chalmers Manufacturing Company, Milwaukee, Wis., a corporation of Delaware Application March 28, 1949, Serial No. 83,818

10 Claims. (Cl. 97—47)

This invention relates generally to tractor mounted implements and is more particularly concerned with and has as an object the provision of an improved tractor-implement combination incorporating features of construction and arrangement affording an effective support for rear mounted tools, more especially track eradicators, affording adequate protection for the tractor power plant or other damageable tractor parts positioned between the rear traction means and rearwardly of the axle structure supporting same and/or affording ready access to a drawbar structure positioned in underlying relation to the above mentioned damageable parts.

The construction and operation of an illustrative apparatus embodying the invention will become readily apparent as the disclosure progresses and particularly points out those features considered of special importance. And accordingly, the present invention may be considered as comprising the various constructions and/or combinations hereinafter more fully set forth in the detailed description and appended claims, reference being had to the accompanying drawing of an illustrative apparatus, in which:

Fig. 3 is a rear view of the apparatus shown in Fig. 2; and

Fig. 4 is a detail showing of the lift and positioning mechanism.

Figures 1, 2:
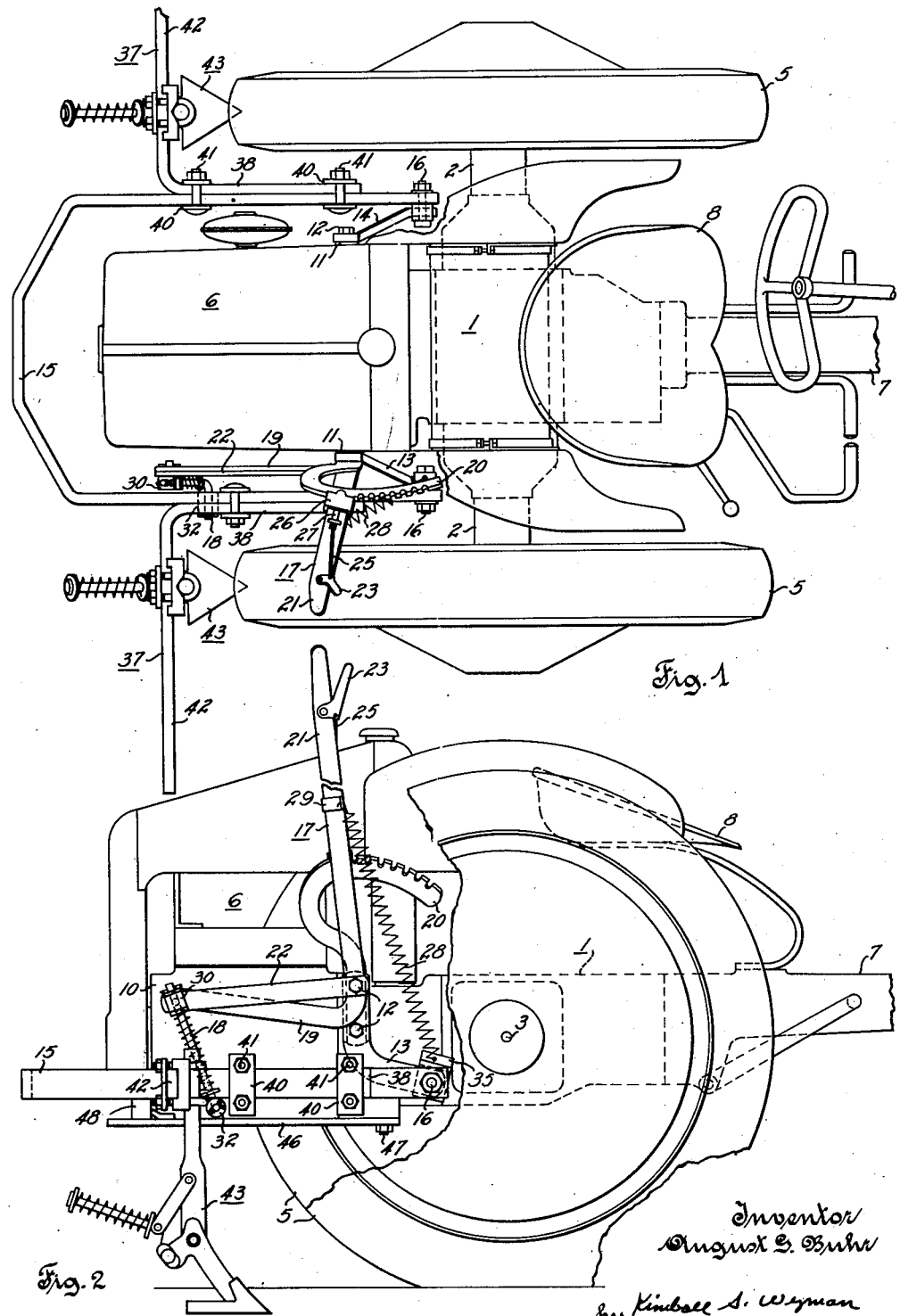
Fig. 1 is a plan view of the rear portion of a tractor-implement combination embodying the invention.
Fig. 2 is a side view of the apparatus shown in Fig. 1 with parts broken away to better show the implement frame supports.

Referring to Figs. 1-3, inclusive, it will be seen that the tractor portion of the combination comprises generally a rear housing structure 1 including laterally extending portions 2 rotatably supporting a pair of driving axles 3 mounting a pair of laterally spaced ground engaging tractor wheels 5 at opposite ends thereof, an engine 6 carried by housing structure 1 in rearwardly extending relation thereto and drivingly connected to axles 3 by conventional means including a change speed gearing and differential mechanism (not shown), and a stub frame member 7 extending forward from the central portion of housing 1 and mounting an operator's seat or station 8 in elevated relation thereto immediately in advance of engine 6. The forward portion of the tractor may be of any suitable design and is not shown in the accompanying drawings since a disclosure thereof is believed unnecessary for a complete understanding of the present invention.

Tractor engine 6 includes a lower housing portion 10 preferably in the nature of a metal casting which has integrally formed therewith at the forward end of the housing a pair of lugs 11 which project laterally therefrom. Lugs 11 are essentially attaching pads and each includes a pair of vertically aligned threaded bores (not shown) adapted to receive cap screws 12 or the like. A pair of L-shaped strap members 13 and 14 are detachably secured at either side of the engine housing to lugs 11 by cap screws 12, and it will be noted (Fig. 1) that the forwardly extending part of straps 13 and 14 are bent outwardly from engine housing 10. A combination implement frame and bumper structure in the form of a generally U-shaped frame member or yoke 15, disposed in protective relation to the rear end and sides of engine housing 10, is detachably connected at the forward end portion of each of its legs to the forward end of L-shaped strap members 13 and 14, as by bolts 16, for pivotal movement relative thereto.

For selectively positioning yoke 15 relative to engine housing 10 for movement about the transverse pivot axis afforded by bolts 16 there is provided a lift means comprising a lever and quadrant structure 17 and a lift rod 18. More specifically, in addition to L-shaped member 13 cap screws 12 also fixedly secure a ratchet part 20 to attaching pad 11 at the right side of engine housing 10, and a lever 21 is pivotally mounted on upper cap screw 12 in side abutting relation to the ratchet or quadrant 20. The lower end of lever 21 includes a rearwardly extending integral part comprising lift arm 19 which is additionally braced by a gusset strap 22 or the like. For securing lever 21, and consequently lift arm 19, in any selected vertical position there is provided a detent mechanism comprising a hand grip 23, a latch rod 25, a plunger guide box 26, and a plunger 27 adapted for engagement with any one of the notched portions of ratchet 20. As is customary in this type of detent mechanism a spring (not shown) is provided in plunger guide box 26 to constantly urge plunger 27 in a downward direction and upon movement of hand grip 23 toward lever 21, latch rod 25 acts against such spring to move plunger 27 out of engagement with ratchet 20 thereby affording free pivotal movement of lever 21 about the pivot axis afforded by upper cap screw 12. A balance spring 28 is connected at one end to a bracket 29, carried by the upper portion of lever 21, and at the other end to a bracket 35 carried by pivot bolt 16 to assist the operator in moving lever 21 forward.

Looking particularly at Fig. 4, it will be seen that the rearmost portion of lift arm 19 has pivotally attached thereto a trunnion 30 having aligned openings (not shown) through the laterally projecting side portions thereof. Lift rod 18 is slidably positioned through the aligned openings in trunnion 30 and a cotter pin 31, or the like, through the upper end portion of rod 18 limits downward movement thereof relative to trunnion 30. The lower end of lift rod 18 is bent outwardly at right angles to the main portion of the rod (see also Fig. 1) and is rotatably mounted in a transverse sleeve like part 32 welded or otherwise suitably secured to the adjacent lower edge of yoke 15 in underlying relation to lift arm 19. Rod 18 is detachably fixed in sleeve like part 32 by cotter pin 33 or the like. To avoid the imparting of any appreciable shock load on lift arm 19 through yoke 15 and lift rod 18 there is provided a compression spring 34 positioned in encircling relation to rod 18 between a spring seat 36, fixed to rod 18, and the lower surface of trunnion 30.

For mounting tools on yoke 15 rearward of the tractor, particularly ground engaging tools for loosening the earth packed by the weight of traction wheels 5, there is provided a pair of similar frame members 37, generally L-shaped, adapted for longitudinally adjustable fixed connection with the leg portions of yoke 15 (Fig. 1). Specifically, one leg portion 38 of each frame member 37 is positioned in side abutting relation to one leg of yoke 15 and is selectively positioned therealong by any suitable clamping means such as the illustrated straps 40 and bolts 41. The other leg 42 of each L-shaped bar or frame member 37 projects laterally away from yoke 15 and affords a mounting means for selectively positioning shovels 43, or other similar tools, therealong in fixed relation to the bar. And in this connection it will be noted that leg 42 may be made of any length to thereby provide for mounting more than one tool thereon and, also, to permit shifting the tool or tools to conform with any selected tread width spacing of ground engaging tractor wheels 5. In addition, it will be noted that the length of legs 38 and 42 may be different as shown, and that either leg may be selectively secured in side abutting relation to yoke 15 to thereby change the effective length of the tool supporting or free portion thereof.

In Figs. 2 and 3 it will be seen that the drawbar structure mounted on the tractor for pulling implements in trailing relation thereto comprises an elongated member 46 fixed at one end to the underside of the forward portion of housing 19, as by bolt 47, for pivotal movement about a generally vertical axis and a bail 48 secured to the rear end of housing for supporting the free end of drawbar 46. And in this connection it will be noted that when the tools are in their ground engaging position (as shown in Figs. 2 and 3) frame parts 15 and 37 are above the level of drawbar 46 and, therefore, in no way interfere with the normal use of the drawbar. Also it will be noted (see Fig. 1) that the U-shaped member or yoke 15 presents generally parallel side portions disposed in proximate protective relation to the opposite sides of the power plant 6, and that these side portions of the yoke are united by a rearwardly bowed portion disposed in similar protective relation to the rear portion of said power plant.

Thus it should be obvious from the foregoing description that apparatus constructed in accordance with the present invention affords a vertically movable support for rear mounted tools 43 which also provides protection for damageable parts, such as engine 6, located at the rear of the tractor and yet permits free use of, and ready access to, the drawbar 46. And although shown and described as having particular utility when applied to a tractor having an engine mounted in the rear it is apparent that certain features of this invention are of more general application and that, therefore, it is not intended to limit the invention to the exact constructions and combinations herein disclosed as various modifications within the scope of the appended claims may occur to persons skilled in the art.

It is claimed and desired to secure by Letters Patent:

1. In a tractor having a wide rear axle structure supported on a pair of traction means mounted on said axle structure adjacent opposite ends thereof, having a power plant mounted between said traction means in rearwardly extending relation to said axle structure, and having a drawbar structure operatively disposed between said traction means and in underlying relation to said power plant, the combination of an implement frame and bumper structure comprising a generally U-shaped part supported in proximate protective relation with respect to the rear and opposite side portions of said power plant through means affording vertical swinging movement of said part about a transverse axis adjacent said axle structure, a pair of similar L-shaped bars having selected sides thereof detachably secured to opposite side portions of said U-shaped part for adjustment therealong and positioned with their other sides projecting laterally outward to the rear of said traction means, tools mounted on said other sides of said L-shaped bars for adjustment longitudinally thereof, and means for vertically adjusting said U-shaped part to selectively position said tools in operative or nonoperative relation to the ground, said U-shaped part being protectively associated with said power plant throughout the range of vertical adjustment.

2. In a tractor having a wide rear axle structure supported on a pair of traction means mounted on said axle structure adjacent opposite sides thereof, and having a power plant mounted between said traction means in rearwardly extending relation to said axle structure and projecting beyond the rear of the former, the combination of an implement frame and bumper structure comprising a generally U-shaped part supported in proximate protective relation with respect to the rear and opposite side portions of said power plant through means affording vertical swinging movement of said part about a transverse axis adjacent said axle structure, a pair of L-shaped bars having selected sides thereof detachably secured in side abutting relation to opposite side portions of said U-shaped part for adjustment therealong longitudinally of the tractor with their other sides projecting laterally outward to the rear of said traction means, tools mounted on the outwardly projecting sides of said L-shaped parts for adjustment therealong laterally of the direction of travel, and means for vertically adjusting said U-shaped part for selectively positioning said tools in operative or nonoperative relation to the ground, said U-shaped part being protectively associated with said power plant throughout the range of vertical adjustment.

3. In a tractor having a wide rear axle structure supported on a pair of traction means mounted on said axle structure adjacent opposite sides thereof, having a power plant mounted between said traction means in rearwardly extending relation to said axle structure and projecting beyond the rear of the former, and having a drawbar structure operatively disposed centrally of the tractor and in underlying relation to said power plant, the combination of an implement frame and bumper structure comprising a generally U-shaped part supported in proximate protective relation with respect to the rear and opposite side portions of said power plant through means affording vertical swinging movement of said part about a transverse axis adjacent said axle structure, a pair of L-shaped bars having selected sides thereof detachably secured in side abutting relation to opposite side portions of said U-shaped part for adjustment therealong longitudinally of the tractor with their other sides projecting laterally outward to the rear of said traction means, tools mounted on the outwardly projecting sides of said L-shaped parts for adjustment therealong laterally of the direction of travel, and means for vertically adjusting said U-shaped part for selectively positioning said tools in operative or nonoperative relation to the ground, said U-shaped part when lowered to a tool working position being above said drawbar structure and thereby rendering same readily connectable with a trail behind implement.

4. In a tractor having a wide rear axle structure supported on a pair of traction means mounted on said axle structure adjacent opposite sides thereof, having a power plant mounted between said traction means in rearwardly extending relation to said axle structure and projecting beyond the rear of the former, and having a drawbar structure operatively disposed centrally of the tractor and in underlying relation to said power plant, the combination of an implement frame and bumper structure comprising a pair of supports carried by opposite forward side portions of said power plant in depending relation thereto, said supports presenting laterally aligned pivot mountings disposed below said axle structure adjacent the rear side thereof and above said drawbar structure, a generally U-shaped part supported on said pivot mountings for vertical swinging movement in proximate protective relation with respect to the rear and opposite side portions of said power plant, a pair of L-shaped bars having selected sides thereof detachably secured to opposite side portions of said U-shaped part for adjustment therealong and positioned on said part with their other sides projecting laterally outward to the rear of said traction means, tools mounted on said other sides of said bars for adjustment therealong laterally of the direction of travel, and means for vertically adjusting said U-shaped part for selectively positioning said tools in operative or nonoperative relation to the ground, said U-shaped part being protectively associated with said power plant throughout the range of vertical adjustment and when lowered to a tool working position being above said drawbar structure thereby rendering same readily connectable with a trail behind implement.

5. In a tractor having a wide rear axle structure supported on a pair of traction means mounted on said axle structure adjacent opposite sides thereof, and having a power plant mounted between said traction means in rearwardly extending relation to said axle structure and projecting beyond the rear of the former, the combination of an implement frame and bumper structure comprising a pair of supports carried by opposite forward side portions of said power plant in depending relation thereto, said supports presenting laterally aligned pivot mountings disposed below and adjacent the rear side of said axle structure, a generally U-shaped part supported on said pivot mountings for vertical swinging movement in proximate protective relation with respect to the rear and opposite side portions of said power plant, a pair of L-shaped bars having selected sides thereof detachably secured to opposite sides of said U-shaped part for adjustment therealong and positioned on said part with their other sides projecting laterally outward to the rear of said traction means, tools mounted on said other sides of said bars for adjustment therealong laterally of the direction of travel, and means for vertically adjusting said U-shaped part to selectively position said tools in operative or nonoperative relation to the ground, said U-shaped part being protectively associated with said power plant throughout the range of vertical adjustment.

6. In a tractor having a wide rear axle structure supported on a pair of traction means mounted on said axle structure adjacent opposite ends thereof, having damageable parts mounted thereon in rearwardly extending relation to said axle structure, said damageable parts being disposed between side opposed portions of said traction means and projecting beyond the rear thereof, the combination of an implement frame and bumper structure comprising a generally U-shaped part disposed between said traction means and supported on said tractor so as to encompass the rear and opposite sides of said damageable parts in proximate protective relation thereto, said U-shaped part being supported on said tractor through means affording vertical swinging movement of said U-shaped part about a transverse axis adjacent said axle structure, a pair of tool carrying bars independently mounted on opposite sides of said U-shaped part disposed to the rear of said traction means and projecting laterally therefrom, and means for vertically adjusting said U-shaped part to selectively position the tools on said bars in operative and nonoperative relation to the ground, said U-shaped part encompassing said damageable parts in proximate protective relation thereto throughout the range of said vertical adjustment.

7. In a tractor having a wide rear axle structure supported on a pair of traction means mounted on said axle structure adjacent opposite ends thereof, having damageable parts mounted thereon in rearwardly extending relation to said axle structure, said damageable parts being disposed between side opposed portions of said traction means and projecting beyond the rear thereof, the combination of an implement frame and bumper structure comprising a generally U-shaped part disposed between said traction means and supported on said tractor so as to encompass the rear and opposite sides of said damageable parts in proximate protective relation thereto, said U-shaped part being supported on said tractor through means affording vertical swinging movement of said U-shaped part about a transverse axis adjacent said axle structure, a pair of L-shaped tool carrying bars with legs of unequal length independently mounted by either leg on opposite sides of said U-shaped part disposed to the rear of said traction means with the free legs of said bars projecting laterally therefrom, and means for vertically adjusting said U-shaped part to selectively position the tools on said bars in operative and nonoperative relation to the ground, said U-shaped part encompassing said damageable parts in proximate protective relation thereto throughout the range of said vertical adjustment.

8. In a tractor having a wide rear axle structure supported on a pair of traction means mounted on said axle structure adjacent opposite ends thereof, having damageable parts mounted thereon in rearwardly extending relation to said axle structure, said damageable parts being disposed between side opposed portions of said traction means and projecting beyond the rear thereof, the combination of an implement frame and bumper structure comprising a generally U-shaped part disposed between said traction means and supported on said tractor so as to encompass the rear and opposite sides of said damageable parts in proximate protective relation thereto, said U-shaped part being supported on said tractor through means affording vertical swinging movement of said U-shaped part about a transverse axis adjacent said axle structure, said U-shaped part presenting generally parallel opposed side portions united by a rearwardly bowed portion, a pair of tool carrying bars mounted on said side portions for independent adjustment therealong and projecting laterally outward from opposite sides of said U-shaped part to the rear of said traction means and in advance of said bowed portion, and means for vertically adjusting said U-shaped part to selectively position the tools on said bars in operative and nonoperative relation to the ground, said U-shaped part encompassing the damageable parts in proximate protective relation throughout the range of said vertical adjustment.

9. In a tractor having a wide rear axle structure supported on a pair of traction means mounted on said axle structure adjacent opposite ends thereof, having a power plant mounted thereon in rearwardly extending relation to said axle structure, said power plant being disposed between side opposed portions of said traction means and projecting beyond the rear thereof, and having a drawbar structure operatively disposed between said traction means and in underlying relation of said power plant, the combination of an implement frame and bumper structure comprising a generally U-shaped part disposed between said traction means and supported on said tractor so as to encompass the rear and opposite sides of said power plant in proximate protective relation thereto, said U-shaped part extending beyond said drawbar and being supported on said tractor through means affording vertically swinging movement of said U-shaped part about a transverse axis adjacent said axle structure, a pair of tool carrying bars independently mounted on opposite sides of said U-shaped part projecting laterally outward therefrom in the rear of said traction means, and means for vertically adjusting said U-shaped part to selectively position the tools on said bars in operative and nonoperative relation to the ground, said U-shaped part when lowered to a tool working position being disposed above said drawbar structure and thereby rendering the latter readily connectable with trail behind implements.

10. In a tractor having a wide rear axle structure supported on a pair of traction means mounted on said axle structure adjacent opposite ends thereof, having a power plant mounted thereon in rearwardly extending relation to said axle structure, said power plant being disposed between side opposed portions of said traction means and projecting beyond the rear thereof, and having a drawbar structure operatively disposed between said traction means and in underlying relation to said power plant, the combination of an implement frame and bumper structure comprising a generally U-shaped part disposed between said traction means and supported on said tractor so as to encompass the rear and opposite sides of said power plant in proximate protective relation thereto, said U-shaped part extending beyond said drawbar and being supported on said tractor through means affording vertical swinging movement of said U-shaped part about a transverse axis adjacent said axle structure, said U-shaped part presenting generally parallel opposed side portions united by a rearwardly projecting bowed portion, a pair of tool carrying bars mounted on said side portions for independent adjustment therealong and projecting laterally outward from opposite sides of said U-shaped part to the rear of said traction means and in advance of said bowed portion, and means for vertically adjusting said U-shaped part to selectively position the tools on said bars in operative and nonoperative relation to the ground, said U-shaped part when lowered to a tool working position being disposed above said drawbar structure and thereby rendering the latter readily connectable with trail behind implements.

AUGUST G. BUHR.

REFERENCES CITED

The following references are of record in the file of this patent:

UNITED STATES PATENTS

| Number | Name | Date |
|---|---|---|
| 1,616,099 | Williams | Feb. 1, 1927 |
| 1,656,773 | Burnett | Jan. 17, 1928 |
| 1,824,077 | Dennis | Sept. 22, 1931 |
| 1,932,112 | Lindgren | Oct. 24, 1933 |
| 2,005,568 | Smith | June 18, 1935 |
| 2,386,378 | Wippel | Oct. 9, 1945 |
| 2,483,565 | Strandlund | Oct. 4, 1949 |